G. PENDERGAST AND R. F. ETHIER.
FASTENER FOR LICENSE PLATES.
APPLICATION FILED APR. 13, 1921.
1,421,548.
Patented July 4, 1922.
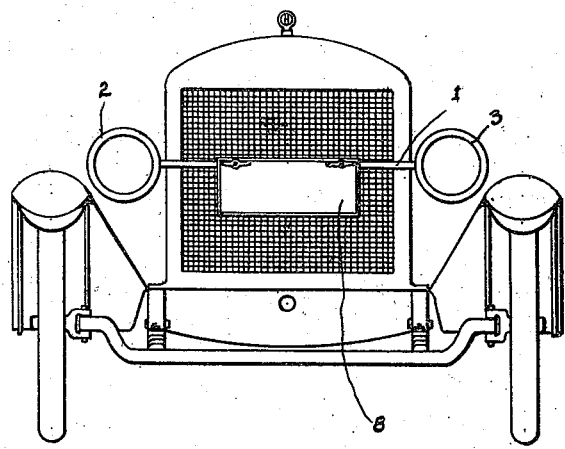
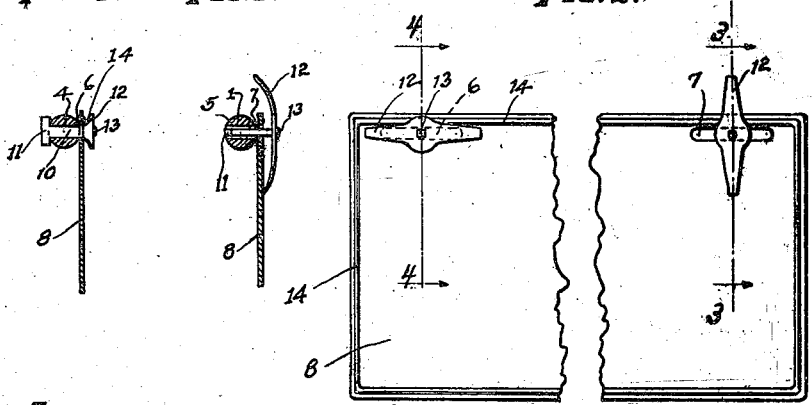
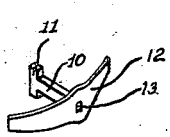

UNITED STATES PATENT OFFICE.

GEORGE PENDERGAST AND RAYMOND F. ETHIER, OF MILWAUKEE, WISCONSIN.

FASTENER FOR LICENSE PLATES.

1,421,548.  Specification of Letters Patent.  Patented July 4, 1922.

Application filed April 13, 1921. Serial No. 461,065.

*To all whom it may concern:*

Be it known that we, GEORGE PENDERGAST and RAYMOND F. ETHIER, citizens of the United States, residing at Milwaukee, county of Milwaukee, and State of Wisconsin, have invented new and useful Improvements in Fasteners for License Plates, of which the following is a specification.

This invention relates to fasteners for license plates.

The object of this invention is to provide simplified means for securing an automobile license plate to its supporting bracket.

More particularly it is the object of this invention to provide a novel and simple form of fastening device which can be manufactured cheaply and which can be applied easily to bind an automobile license plate securely to its bracket.

It is a further object of this invention to provide a fastening device which will hold the plate so tightly as to prevent rattling and which will co-operate with the plate to bind itself in a position from which vibration cannot shake it.

In the drawings:

Figure 1 is a front elevation of an automobile showing a license plate held in place by a device embodying this invention.

Figure 2 is a front elevation of a plate secured in accordance with this invention, showing on an enlarged scale the plate securing means.

Figures 3 and 4 are detail views taken on sections indicated respectively by lines 3—3 and 4—4 of Figure 2.

Figure 5 is a perspective view of the fastening device.

Like parts are identified by the same reference characters throughout the several views.

Automobiles and other motor vehicles are customarily provided with brackets or other devices adapted to mount license plates. In the drawing accompanying this specification, the license plate support is illustrated in the form of a rod 1 extending transversely across the machine between the head lights 2 and 3. The rod is provided with slots 4 and 5 with which the slots 6 and 7 in the license plate are adapted to register. Plates have heretofore been secured by passing bolts or straps through the slots 4 and 6 and through the slots 5 and 7 to secure the plate 8 to the bracket or support 1. The device of this invention is intended to replace the securing means heretofore used by a cheaper article which can be more quickly and securely fastened.

The securing device embodying this invention comprises a flat piece of metal shaped to form a shank 10 and a head 11 with a spring 12 riveted to the other end of the shank and disposed transversely to the head. The end of the shank 10, upon which spring 12 is mounted, may be reduced slightly in size, as shown at 13 in Figure 2, passed through an opening in the spring, and swaged or headed to bind the spring to the shank. So constructed, the device can be made up very cheaply and is more satisfactory in use than anything heretofore available.

It will be noted that the license plate 8 is provided, in accordance with the usual practice, with a bead 14 which extends completely around the plate adjacent to its edge. The spring 12 of my improved fastening device is made of sufficient width so that when the shank 10 is engaged in the slot 6 both ends of the spring 12 will lie adjacent to and preferably in bearing contact with the bead 14. In this way the device is secured against any movement tending to release it.

When it is desired to use a fastening device embodying this invention, the license plate 8 is brought into proximity with the bracket or rod and the slots 6 and 7 of the license plate are made to register with slots 4 and 5 of the bracket or support here shown at 1. The fastening device, above described, is now inserted through each of the slots, the heal 11 being so disposed as to extend longitudinally of the slot and pass freely therethrough. The spring 12 is so bowed that the head 11 will not protrude through the slot 6 of the bracket or support until pressure is exerted upon the center of the spring 12 adjacent to the headed end 13 of the shank 10 to flex the spring and force the shank 10 farther through the slot. It will be understood that during the operation thus far described, the device will occupy the position relative to the license plate in which it appears at the right hand end of Figure 2 and in Figure 3.

With the spring 12 flexed, the head 11 will be free to turn upon the inside of the support 1 and the device may be rotated ninety degrees to the position in which it appears at the left hand end of Figure 2. In this position the head 11 will bear against the support 1, as shown in Figure 4, and the ends of the spring 12 will rest against the bead 14 of license plate 8, as is also clearly illustrated in Figure 4. It will be understood that the spring 12, bearing at its ends upon the license plate, is at all times flexed from its natural position and tends to draw the license plate 8 and the support 1 tightly together. The flexion of spring 12 also serves to prevent the accidental rotation and consequent release of the device since a considerable force is required to further flex the spring sufficiently to raise either of its ends over the bead 14 upon the license plate.

Obviously, this device would operate satisfactorily to hold a license plate unequipped with a bead such as is here indicated at 14, but license plates are customarily provided with such a bead and where the bead is present the securing device cooperates therewith to maintain its position against any possibility of accidental displacement. In fact, a securing device embodying this invention will be less affected by vibration than will a nut and bolt, such as has previously been used for this purpose.

We claim:

1. The combination with a spring in the form of a bow, of a shank secured thereto intermediate of its ends, and an integral head upon the shank of a thickness substantially equal to that of the shank, the greatest dimension of said head being disposed transversely of said spring.

2. A fastening device comprising a T-shaped member of substantially uniform thickness, a spring in the form of a bow secured intermediate its ends upon the shank of the T-shaped member and transversely of the head thereof, and means for preventing rotation of the spring relative to the T-shaped member.

3. The combination with a supporting bracket provided with slots, of a license plate having slots adapted to register therewith, a bead upon said plate, a shank adapted to penetrate the registering slots, a head upon the shank adapted to bear upon the bracket when the shank is rotated a quarter turn, and means carried by the outer end of the shank for exerting resilient pressure upon the license plate adjacent to said bead.

4. The combination with a slotted supporting bracket, of a license plate having a peripheral bead and slots adjacent thereto, a metallic pin provided with a flat head adapted for insertion through the registering slots in the plate and the bracket, and a bowed spring carried intermediate of its ends by the pin and disposed transversely of the head, whereby when the pin is rotated a quarter turn from the position of insertion the head will engage said support and the spring will engage said bead.

5. The combination with a slotted bracket and a license plate having slots in registry therewith, of a pin adapted for insertion through said slots, a head upon the pin flattened whereby it may pass through said slots when rotated into registry therewith, and a bowed spring carried by the pin transversely of said head, the length of the pin being such that the ends of the spring will contact with the plate before the head has cleared the slot.

6. A slotted bracket, a slotted license plate having a peripheral bead, a shank adapted to be inserted through the registering slots, an integral head adapted to be engaged with the support, and a bowed spring carried by the shank and adapted to press resiliently upon the plate at two points adjacent to the bead when the head is in engagement with the support.

7. The combination with a slotted support and a slotted license plate having a peripheral bead, of a fastening device freely insertable through said slots, means operable by the partial rotation of the device to engage the support, and resilient means for pressing the plate toward the support, said last named means being adapted to interact with the bead upon said plate to oppose the counter-rotation of said device.

GEORGE PENDERGAST.
RAYMOND F. ETHIER.